Sept. 1, 1942.  P. R. CUDDIHY  2,294,539
SYSTEM OF SYLLABLE ACCENTUATION FOR USE IN DICTIONARIES,
TEXT BOOKS, AND THE LIKE
Filed June 13, 1941
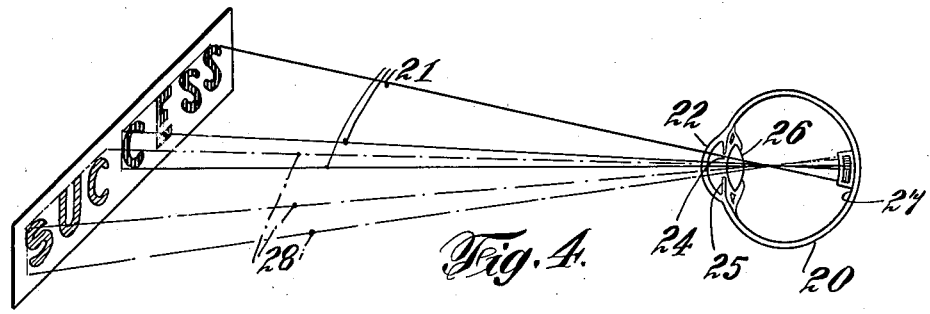
Fig. 1.  Fig. 2.  Fig. 3.
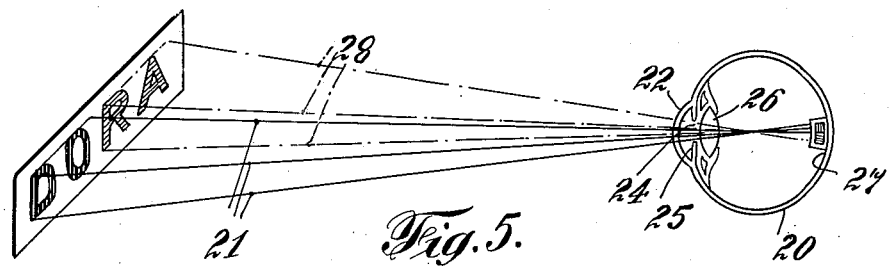
Fig. 4.
Fig. 5.
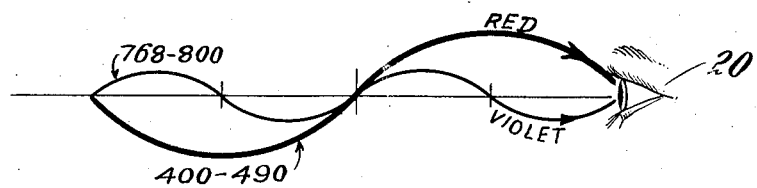
Fig. 6.
INVENTOR.
Paul R. Cuddihy
BY C. P. Goepel
his ATTORNEY Patented Sept. 1, 1942

2,294,539

UNITED STATES PATENT OFFICE 2,294,539

SYSTEM OF SYLLABLE ACCENTUATION FOR USE IN DICTIONARIES, TEXTBOOKS, AND THE LIKE

Paul R. Cuddihy, Bay Shore, N. Y.

Application June 13, 1941, Serial No. 397,946

1 Claim. (Cl. 283—46)

This invention relates to systems of syllable accentuation for use in dictionaries, text books, and the like, and other publications in which the printing or display of words is so arranged as to facilitate their accentuation in an automatic manner responsive to the excitation of colors of different wave lengths upon the eye of the reader.

Usually diacritics are used to indicate the different stresses to be placed upon a syllable, one for the primary or heaviest stress and two for the next important, or one heavier than the other, then allowing the third or fourth, if the word has three or four syllables to take care of themselves. Many users of such dictionaries do not know the particular system adopted by the particular dictionary being used, and so have to examine the preface of the particular book being used and as in the larger dictionaries these prefaces are rather voluminous, the user often becomes discouraged. Others guess at it, and some of these guess wrong taking one symbol to have the meaning opposite to that intended.

The eye sees through a complicated mechanism which is a nerve center directly connected to the brain. The terminals of these nerves in the rear of the eye are called rods and cones. Both rods and cones are affected by light, the cones reacting to color.

Different colors cause varying excitation of the cones depending upon the rate of vibration of that color.

The application of such a principle to a means, as to a sheet of paper having configurations thereon corresponding to the shape of the letters of the alphabet, arranged in word formation, but with that part of the word or syllable which in accordance with the authorities is desired to be stressed most, arranged in a color having vibrations to influence the retina before any other color, and with another syllable to be stressed less, in a color at the other end of the visible range of color so as to strike the influence after any other color, used for the second stress applied, enables an authoritative teaching to take place without the aid of any other indicia. The reader thereby, due to the reactions produced, without conscious effort and automatically, accentuates the word accordingly and correctly.

The invention will be hereinafter more fully described, embodiment thereof shown in the drawing, and finally pointed out in the claim.

In the accompanying drawing,

Figure 1 shows a word accentuated on its first syllable with panels vertically arranged to receive other words;

Figure 2 shows a word accentuated on its last syllable with panels vertically arranged to receive other words;

Figure 3 is a similar view of a series of vertically arranged words pronounced with syllables accentuated differently;

Figure 4 is a perspective view of the functional operation of a color influencing the eye, after that of another color, the full lines exciting the eye first;

Figure 5 is a perspective view in which the color of the first accentuated syllable influences the eye first; and Figure 6 is a diagrammatic side view showing the wave lengths of the colors indicated.

Similar characters of reference indicate the same parts throughout the various views.

Referring to the drawing, in Figure 1 the superimposed words arranged vertically above each other on a page or sheet of paper, or the like, as shown in the uppermost panel and such words as may be inserted in the lower panels, are all of the same general accentuation, namely, accentuated on the first syllable. In Figure 2 the words similarly arranged, are all accentuated on the last syllable, and in Figure 3 the words are variously accentuated. Each letter of each word is printed in outline type form to permit filling in of color, or can be printed or lithographed with color print, full face throughout.

Recognizing the fact that red of a certain hue and tint excites the eye before any other color, I use this red for the syllable of a word to be most sharply accentuated. The inducing of excitation in the retina of the eye by such color, is like a command of the brain or nerve centers to accentuate the red colored syllable with sharpness and positive emphasis. The function of the vibrations is to induce the muscular responses and reactions, to so accentuate. To contrast with such a frequency, the next syllable of a two syllable word is given a color which will excite the eye after any other color. Violet, or blue of the violet tint and hue is such a color. The sequence of impulses upon the eye is then first a very low frequency and then a very high frequency, and in consequence, by the reactions created, the accentuation becomes a primary followed by a secondary. It is due to the functioning of the attributes of these colors, that automatic excitations and responses are obtained, which act subconsciously upon the reader, who then automatically pronounces one syllable with greater emphasis than the other. Likewise, where the first syllable of a word has a secondary accentuation, and is colored blue or violet, and the other syllable a primary accentuation and is colored red, the red vibrations excite a more positive accentuation upon that syllable colored in red than on the first syllable colored in blue or violet. By arranging words alternately, one word with a primary accentuation on the first syllable, and the next word with a primary accentuation on the last syllable, with the syllables colored accordingly, and so on, the test of primary and secondary reactions can be readily carried out, the red vibrations compelling the primary accentuation due to muscular inducements from the retina excited quicker by such frequencies than by the lower.

In Figure 4, for instance, the red colored last syllable will excite the eye first, and warn the eye that primary accentuation must take place on the last syllable, which however is suspended momentarily until the secondary emphasis upon the first syllable is carried out. On the other hand, in Figure 5, the first syllable excites the eye first, is accentuated with a primary accentuation and then automatically the secondary accentuation of the blue or violet colored syllable takes place. For words of three or more syllables, intermediate color vibrations for intermediate accent is used.

In Figure 6 is shown diagrammatically by relative lengths, the relative wave lengths of the two extreme colors.

It will be noted that the invention consists of a system of syllable accentuation, which consists in providing the most accentuated syllable with a pigment color having the quickest excitation upon the eye at normal reading distance, and the least accentuated syllable with a pigment color having the least excitation factor, whereby the retina of the eye of the observer sets up reactions inducing the most positive primary accentuation of the syllable so colored and the least positive or secondary accentuation of the syllable colored in the least excitation factor.

While variations are found, the generally adopted color scale of Young and Helmholtz may be here referred to, which is:

| | Vibrations, billions |
|---|---|
| Red | 400–470 |
| Orange | 470–520 |
| Yellow | 520–590 |
| Green | 590–650 |
| Blue | 650–700 |
| Indigo | 700–760 |
| Violet | 760–800 |

The pigment colors being red, yellow and blue.
The reflection factor of the spectral regions of the following colors, red, yellow and blue, is:

| | |
|---|---|
| Red | 0.06 |
| Yellow | 0.17 |
| Blue | 0.28 |

I have discovered the unexpected action of these colors in inducing mental responses inducing different emphasis of syllables of words when colored in contrast to each other and apparently subjected simultaneously to the eye, the more emphatic stress resulting from the color most quickly exciting the eye, as red, and more slowly exciting the eye, as violet or blue. Applying this principle to a symbol of thought, such as a word of more than one syllable, the accentuation automatically follows this rule of excitation, notwithstanding the fact that the eye beholds both syllables simultaneously.

In the drawing, Figure 1 shows a series of superimposed panels, 10, 11, and 12, with the word "Dante" colored for red and blue, the emphatic syllable "dan" being in red and the secondarily stressed syllable "te" being in blue. Similarly accentuated words can be placed in the empty panels 11 and 12.

In Figure 2 a similar series of panels, 13, 14 and 15, superposed in the top panel showing the word "Success" colored in blue and red, the emphatic syllable "cess" being in red. Similarly accentuated words can be placed in the empty panels 14 and 15. The vacant spaces in the panels shown in Figures 1 and 2 are intended for other words, preferably in alphabetical sequences.

In Figure 3 a similar series of panels, 16, 17, and 18, are arranged with "Debate" and "Dante" colored in red and blue, and "Saltpeter" colored in red, yellow and blue, red for greater accentuation of the syllable most stressed. In "Dante," "Dan" is in red and "te" in blue; in "Debate" "De" is in blue and "bate" in red; in "Saltpeter," "Salt" is in yellow, "pe" in red, and "ter" in blue. The most stressed syllable is in red, the least stressed in blue, and the intermediately stressed is in yellow.

In Figure 4 is shown such a panel, 19, with the word "Success" colored in blue and red, and showing the manner in which the respective syllables reflect upon the human eye, 20, shown. The rays, 21, of the primary accentuated syllables strike the corona, 22, pupil 24, iris 25, and pass through the lens 26, and are received by the retina 27, with its cones and rods. The cones are in the middle of the rods, with the cones affected by color, and then by the optic nerve to the brain. The cones differentiate between the ratio of vibrations. The other rays, 28, shown in dot-dash form act in the same way, but excite the eye at a later time. The reverse operation takes place by the use of the word "Dora," colored as shown in Figure 5 with the full lines 21 following the red, and the dot-dash lines 28 the blue.

In Figure 6 is shown, diagrammatically, the respective wave lengths, the longer wave exciting the eye first.

Words act as symbols and these are grouped by the eye in their entirety and automatically dissected by the differentiation of color. In order to have the word comprehended instantaneously at one time, all syllables though of different coloring must be recognized without any interruption, resulting from re-focusing the eye, and this is accomplished by printing the colored syllables in longitudinal alignment with each other. The examples in the drawing show this alignment.

The diacritical marks used for uniform black printing are dispensed with, whereby the syllables are joined and brought close together without any space therebetween; this closeness avoids the necessity of refocusing the eye. Both the top and bottom edges of the letters of the various syllables are horizontally in a straight line, or aligned so that there is no disturbance to the eye grasping the word as an entirety rather than in separate syllables. The arrangement under the invention is such as to avoid all factors negativing the color reactions, so that the instantaneous and automatic reaction of the colors upon the eye, as before described, can be carried out. Also the vertical arrangement of the words successively alphabetically with the syllables are accentuated by the proper disposition of the coloring of the syllables as described. The reading of such alphabetically successively arranged words colored to accentuation variously on the first or last or middle syllables is primary accentuation, soon enables the eye to work automatically with considerable speed. Due to autoreactions, an explanatory table or chart is not necessary.

A tuning-fork, C' (256 vibrations per second), set in motion, travels at 20° C. a distance of 344 m. This causes the first wave to be at a distance of 344 m. from the fork when it has completed its 256th vibration. This proves that in 344 meters there are 256 waves, each having a length of $344/256$ m., or 1.344 m.

Agreeably with the Fraunhofer lines, in air at 20° C. and at 760 m. pressure, the longest wave in the solar spectrum is obtained. With red, the Angström unit for this spectral color, is 68 microns (6870 mm.) namely, $344/256$ m. raised to its 29th power, using the binary numeral (2).

Thus from the lowest independent audible tonic or fundamental C (32 vibrations) red is visible as a light-wave in the 32d octave.

The human being has the power to register vibration through any one of his five senses. Subconsciously, however, he can register only exact movements of light, namely, color. He cannot register the measurements of his taste, touch, smell or hearing subconsciously; but he can register the measurements of light through color. He intuitively apperceives color. Such apperception of the tone of color is a natural, spontaneous, automatic and involuntary act of the will, freed from sensual assistance.

When colors are applied to the different syllables of words, the natural law by which both mind and eye are brought into harmonious control of the percepts and concepts of a human being is availed of, if the colors selected are such that the color used for the most important, i. e., the primarily accentuated syllable excites the eye first, and that used for the least important, i. e., the least stressed syllable excites the eye the least, and that used for the intermediately important, i. e., intermediately stressed syllable excites the eye less than the color used for the primarily accentuated syllable, and more than the color used for the least accentuated syllable.

From the foregoing it is believed that the construction and advantages of the invention may be readily understood by those skilled in the art without further description, it being borne in mind that numerous changes may be made in the details disclosed without departing from the spirit of the invention as set out in the following claim.

I claim:

A system of syllable accentuation which consists in subjecting to the eye of an observer words of more than one syllable vertically arranged upon a flat surfaced sheet, the most accentuated syllable of the word being colored with a pigment color of the longest red wave length and the least accentuated syllable of the same word being colored with a pigment color of the shortest blue-violet wave length, the colored syllables being in horizontal alignment and the letters forming the same being arranged with their upper and lower edges each in horizontal alignment with the syllables joined without intermediate spacing to enable the eye to comprehend instantaneously the word in its entirety, without refocusing and interruption, said words being free from diacritical marks and means to indicate accentuation, other than said contrasting colors, whereby the retina of the eye of the observer is first induced by the colored pigment of the longest wave length, and thereafter by the colored pigment of the shortest wave length, to set up reactions in the mind to accentuate automatically the syllables corresponding to the degree of excitation of the eye, the most positive primary accentuation of the syllables being induced by the syllable colored with the pigment of the longest visible wave length and the least positive or secondary accentuation by the syllable colored with the pigment of the shortest visible wave length.

PAUL R. CUDDIHY.